United States Patent
Perret

(10) Patent No.: US 11,036,184 B2
(45) Date of Patent: Jun. 15, 2021

(54) METHOD OF FABRICATION OF A BLACK WATCH DIAL, AND SAID BLACK WATCH DIAL

(71) Applicant: FEHR et Cie SA, La Chaux-de-Fonds (CH)

(72) Inventor: Joël Perret, Le Locle (CH)

(73) Assignee: FEHR et Cie SA, La Chaux-de-Fonds (CH)

(*) Notice: Subject to any disclaimer, the term of this patent is extended or adjusted under 35 U.S.C. 154(b) by 473 days.

(21) Appl. No.: 15/372,191

(22) Filed: Dec. 7, 2016

(65) Prior Publication Data

US 2018/0157214 A1 Jun. 7, 2018

(51) Int. Cl.
*G04B 19/14* (2006.01)
*G04B 19/12* (2006.01)
*B32B 7/12* (2006.01)
*B32B 15/20* (2006.01)

(52) U.S. Cl.
CPC .............. *G04B 19/12* (2013.01); *B32B 7/12* (2013.01); *B32B 15/20* (2013.01); *G04B 19/14* (2013.01); *B32B 2250/02* (2013.01); *B32B 2255/20* (2013.01); *B32B 2311/12* (2013.01); *B32B 2315/00* (2013.01); *B32B 2451/00* (2013.01)

(58) Field of Classification Search
CPC .................................. G04B 19/12; G04B 19/14
See application file for complete search history.

(56) References Cited

U.S. PATENT DOCUMENTS

| 4,583,866 | A  | * | 4/1986  | Kasai  ................... | G04B 19/12 |
|---|---|---|---|---|---|
|  |  |  |  |  | 368/232 |
| 9,791,769 | B2 |  | 10/2017 | Sun et al. |  |
| 10,112,214 | B2 | * | 10/2018 | Mckenna ............... | B05D 5/083 |
| 2010/0214880 | A1 |  | 8/2010  | Rappo et al. |  |
| 2011/0301282 | A1 |  | 12/2011 | Magni |  |
| 2013/0029157 | A1 |  | 1/2013  | Karapatis |  |
| 2014/0225329 | A1 | * | 8/2014  | Hayashi ................... | F02F 5/00 |
|  |  |  |  |  | 277/442 |
| 2015/0068908 | A1 |  | 3/2015  | Gay |  |

FOREIGN PATENT DOCUMENTS

| CH | 705576 B1 | 4/2013 |
| WO | WO-2013/150028 A1 | 10/2013 |
| WO | WO-2014/023584 A1 | 2/2014 |
| WO | WO-2014/0180242 A1 | 11/2014 |

OTHER PUBLICATIONS

P. R. Coxon, et al., "The Use of Electro-Deoxidation in Molten Salts to Reduce the Energy Consumption of Solar Grade Silicon and Increase the Output of PV Solar Cells", ScienceDirect; Progress in Natural Science: Materials International, vol. 25, Issue 6, Dec. 2015, pp. 583-590.
French Search Report for FR Application No. 1600834, dated Apr. 19, 2018, 4 pages.

* cited by examiner

*Primary Examiner* — Edwin A. Leon
*Assistant Examiner* — Jason M Collins
(74) *Attorney, Agent, or Firm* — Blank Rome LLP

(57) ABSTRACT

A method of fabrication of a black watch dial, comprising the following steps:
  providing a substrate (1);
  deposition of a black coating (2) on said substrate,
wherein said coating (2) comprises carbon nanotubes (21).

20 Claims, 1 Drawing Sheet

METHOD OF FABRICATION OF A BLACK WATCH DIAL, AND SAID BLACK WATCH DIAL

TECHNICAL FIELD

The present invention concerns a method of fabrication of a black watch dial, and a black watch dial manufactured with this method.

PRIOR ART

The elements of accoutrement used particularly in the making of timepieces, eyeglasses, or writing implements pose particular problems with regard to fabrication and quality of finish. These elements are in fact intended to be observed very close up, so the slightest aesthetic defect will result in a rejection of the item. This is especially the case with watch dials, whose manufacture poses difficult technical challenges in order to meet the very elevated aesthetic requirements of the makers and the customers.

For example, one often wishes to make black watch dials. Besides a fashion statement, black enables a conspicuous contrast with the index numbers and the clock hands which are often made of shiny metal and coated with luminescent material. Thus, a black dial improves the legibility of the display.

As an example, CH705576 describes a method of physical deposition in the vapor phase of a decorative and/or protective coating on a substrate. A black color is obtained at the end of the deposition thanks to a layer of amorphous carbon. The black so obtained is darker than that of many other methods, yet still does not meet the very elevated requirements of certain applications.

BRIEF SUMMARY OF THE INVENTION

One purpose of the present invention is thus to propose a method of fabrication of a black watch dial which is able to produce a different black, preferably a darker and more flat black, than the methods of the prior art.

One purpose of the present invention is to propose a method of fabrication of a black watch dial which is easy to industrialize.

One purpose of the present invention is to propose a method of fabrication of a black watch dial which is different from the methods of the prior art.

According to the invention, these purposes are achieved in particular by a method of fabrication of a black watch dial, comprising the following steps:
  providing a substrate;
  deposition of a black coating on said substrate,
said coating comprising carbon nanotubes.

Carbon nanotubes have the property, known in itself, of absorbing light, particularly light parallel to the axis of the nanotubes, which is trapped in the tube and very seldom can escape from it. The coefficient of absorption of the light by the carbon nanotubes is thus higher than that of all other currently known materials. Consequently, the use of carbon nanotubes on the dial makes it possible to obtain a very black surface. For example, mats of carbon nanotubes have been created which are able to absorb up to 99.955% of the light received.

The use of nanotubes in watch making is known in itself. For example, WO14023584A1 describes an application of nanotubes to facilitate the polymerization of the UV glue used to glue the spiral to the eyebolt of a mechanical movement.

US2010214880A describes a micromechanical part made of silicon, and provided with a supplemental antifriction coating such as one of carbon nanotubes.

US2013029157A describes micromechanical parts of a mechanical watch movement with improved tribological properties thanks to a coating of carbon nanotubes, for example.

WO13150028A1 describes a composite material based on gold, copper and cadmium, and comprising carbon nanotubes. This part can be used for example as ornamentation in the field of watch making. The carbon nanotubes are used to improve the resistivity and thus facilitate later galvanic deposition. They do not directly determine the color of the part.

In all the above documents, the nanotubes are used for different remarkable physical properties, for example, tribological or electrical properties. These properties are important in certain parts of a mechanical watch, but do not present any interest for the fabrication of a watch dial. Consequently, these solutions have never been applied to the fabrication of watch dials.

The black color of carbon nanotubes is known in itself, and used for example in US2011301282A, which suggests a black plastic formed from a quantity between around 0.01 percent and 0.3 percent by weight of material based on carbon nanotubes, the rest being formed by polymer. This method is only suitable for the fabrication of plastic parts, and not the fabrication of watch dials which most often require a metallic substrate.

The substrate can be metallic, which facilitates the priming of the nanotubes at the start of their growth.

The substrate can be made of a nonmetallic material, such as sapphire, on which a metallic deposition has taken place, for example, by evaporation.

The substrate can be organic.

Indexes can be attached to the substrate, such as metallic indexes.

In one embodiment, the coating giving the black color to the dial comprises a varnish, such as a black or optionally a translucent varnish in which carbon nanotubes are diluted. This method has the advantage of an easier implementation, especially in a watch dial factory having a varnishing shop.

The varnish comprises at least 0.1 percent by weight, preferably at least 1 percent, preferably at least 5 percent by weight of carbon nanotubes.

In another embodiment, the deposition of a coating comprises the growth of carbon nanotubes directly on the substrate. This solution makes it possible to create a mat of carbon nanotubes, and thus an extremely black surface.

The thickness of this coating is determined by the length of the nanotubes, the axis of said nanotubes being substantially perpendicular to the upper surface of the substrate. A thickness between 0.05 and 1 mm allows both assurance of a sufficient absorption and a limited thickness of the dial.

The mat of nanotubes can be covered with a lacquer or very fine transparent varnish, for example, for aesthetic reasons or in order to avoid the risk of ungluing of the nanotubes or to encapsulate them.

In another embodiment, the deposition of a coating involves the deposition of a coating comprising the gluing of a plate with carbon nanotubes on the substrate.

The plate can be coated with carbon nanotubes. It can be glued to the substrate. The axis of the nanotubes is preferably substantially perpendicular to the upper surface of the substrate.

This solution makes it possible to obtain a black as intense as the second embodiment, without the need for the growth of the nanotubes directly on the substrate. One thus limits the number of manipulations of the substrate before and after the coating, which reduces the risk of scratching or damaging it. One thus also avoids the risk of deformation of the dial placed in the production room of the nanotubes.

This solution also makes it possible to produce plates with a mat of carbon nanotubes of relatively large dimension, which can then be cut up to coat several dials.

The invention also relates to a black watch dial, in which the black color is obtained thanks to carbon nanotubes.

The invention also relates to a black watch dial obtained by the method described above.

BRIEF DESCRIPTION OF THE FIGURES

Sample embodiments of the invention are indicated in the description illustrated by the enclosed figures in which.

SAMPLE EMBODIMENT(S) OF THE INVENTION

Figure 1:
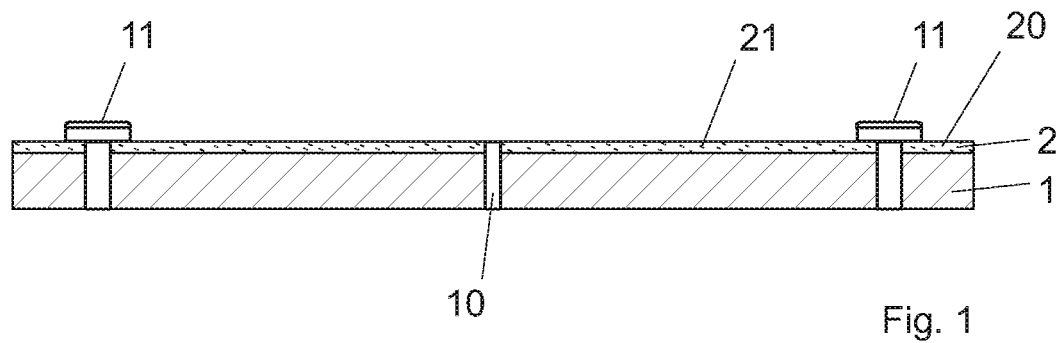
FIG. 1 illustrates a schematic sectional view of a black watch dial according to a first embodiment of the invention.

A first embodiment of the invention shall be described with regard to FIG. 1. In this example, the dial comprises a substrate 1, for example, a metallic substrate 1, such as a substrate of brass. The substrate could also be of a nonmetallic material, such as sapphire, whether or not covered by a metallization to facilitate the adhesion of the carbon.

The substrate is covered by a layer of varnish 2 whose very dark black color is obtained by diluting carbon nanotubes 21, such as agglomerated carbon nanotubes, in a base of varnish 20. The size of the nanotubes is highly exaggerated in the figure; in practice, the nanotubes typically have a diameter of several nanometers and a length less than one millimeter.

The carbon nanotubes 21 improve the coefficient of absorption of light of the varnish base and thus make it possible to obtain a very dark varnish. The varnish, for its part, makes it possible to hold the carbon nanotubes and prevent them from becoming unglued and polluting the inside of the watch.

The dial can be pierced by one or more holes 10 for the passage of the watch hand axles. Indexes 11, such as metallic indexes, can be attached on top of the coating 2.

Figure 2:
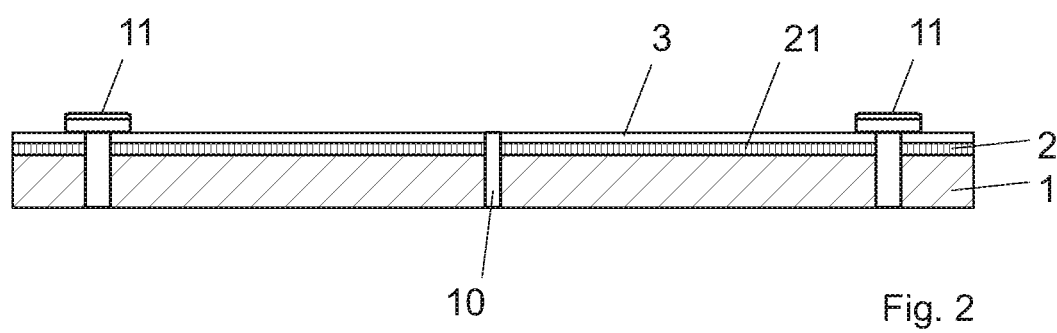
FIG. 2 illustrates a schematic sectional view of a black watch dial according to a second embodiment of the invention.

Another embodiment shall be described with regard to FIG. 2. In this example, a sheet (mat) of carbon nanotubes 2 is produced directly on the substrate 1, for example, by evaporation of carbon at high temperature and under high pressure, in a rare gas atmosphere. Other methods of synthesis, including laser ablation or CVD deposition methods, can be employed.

It is possible to have the carbon nanotubes grow on a layer of binder, not shown, on the substrate 2, in order to reduce the risk of ungluing. In the variant illustrated, an optional transparent lacquer 3 is deposited on top of the mat of carbon nanotubes in order to encapsulate them or for aesthetic reasons.

Figure 3:
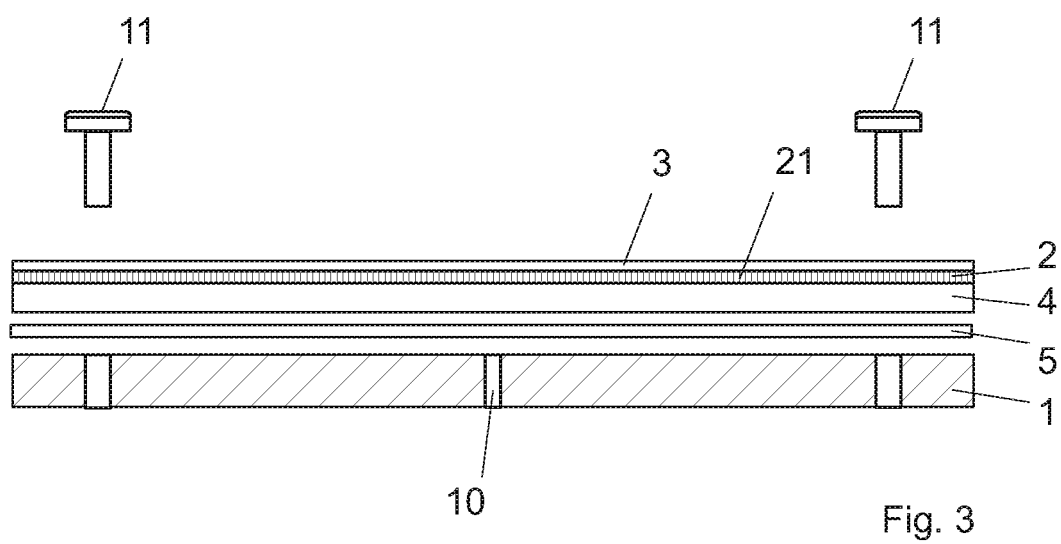
FIG. 3 illustrates a schematic exploded sectional view of a black watch dial according to a third embodiment of the invention.

A third embodiment shall be described with regard to FIG. 3. In this example, a sheet (mat) of carbon nanotubes 2 is produced on a rigid or fixed plate 4 which is then fixed to the substrate 1, for example, by gluing with an adhesive 5. As in the variant above, the mat of carbon nanotubes can be produced by evaporation of carbon at high temperature and under high pressure, in a rare gas atmosphere. Other methods of synthesis, including laser ablation or CVD deposition methods, can be employed. This method has the advantage of not exposing the substrate 1 to the high temperature or pressure of the room for creation of carbon nanotubes. In the variant illustrated, an optional transparent lacquer 3 is deposited on top of the mat of carbon nanotubes 2 in order to encapsulate them.

The invention claimed is:

1. A method of fabrication of a black watch dial, comprising the following steps:
   providing a substrate;
   deposition of a black coating having carbon nanotubes on the substrate, the black coating having a thickness between 0.05 and 1 mm, the coating having a varnish to prevent the carbon nanotubes from becoming unglued,
   applying a transparent lacquer on top of the carbon nanotubes to encapsulate the carbon nanotubes,
   placement of an index on the coating.

2. The method as claimed in claim 1, the substrate being metallic.

3. The method as claimed in claim 2, wherein the varnish comprises at least 0.1 percent by weight of carbon nanotubes.

4. The method as claimed in claim 1, the coating comprising the varnish and carbon nanotubes diluted in the varnish.

5. The method as claimed in claim 4, an axis of the carbon nanotubes being substantially perpendicular to an upper surface of the substrate.

6. The method as claimed in claim 5, the deposition of a coating comprising gluing of a plate with carbon nanotubes on the substrate.

7. The method as claimed in claim 6, the axis of the carbon nanotubes being substantially perpendicular to the upper surface of the plate.

8. The method as claimed in claim 1, the deposition of a coating comprising the growth of carbon nanotubes directly on the substrate.

9. The method as claimed in claim 8, the plate being coated with a mat of carbon nanotubes.

10. The watch dial obtained by the method of claim 1.

11. A black watch dial, comprising a substrate and a layer of black color comprising carbon nanotubes and having a thickness between 0.05 and 1 mm, a varnish preventing the nanotubes from becoming unglued, and further comprising a transparent lacquer on top of the carbon nanotubes in order to encapsulate them, and comprising indexes attached to the layer of black color.

12. The watch dial as claimed in claim 11, comprising a metallic substrate.

13. The watch dial as claimed in claim 11, comprising a metallized substrate.

14. The watch dial as claimed in claim 11, further comprising a coating comprising the varnish and the carbon nanotubes diluted in the varnish.

15. The watch dial as claimed in claim 14, wherein said varnish comprises at least 0.1 percent by weight of carbon nanotubes.

16. The watch dial as claimed in claim 11, the deposition of a coating comprising carbon nanotubes directly on the substrate.

17. The watch dial as claimed in claim 11, an axis of said carbon nanotubes being substantially perpendicular to the upper surface of said substrate.

18. The watch dial as claimed in claim 11, comprising a plate provided with carbon nanotubes on said substrate.

19. The watch dial as claimed in claim 18, said plate being coated with a mat of carbon nanotubes.

20. The watch dial as claimed in claim 19, the axis of said carbon nanotubes being substantially perpendicular to an upper surface of the plate.

\* \* \* \* \*